United States Patent [19]
Barton, Jr.

[11] Patent Number: 5,932,161
[45] Date of Patent: Aug. 3, 1999

[54] METHOD FOR MOLDING ONE-PIECE, MULTIPLE COLOR BODY

[76] Inventor: Bruce G. Barton, Jr., 5265 Mystic Lake Dr., Brighton, Mich. 48116

[21] Appl. No.: 08/827,563

[22] Filed: Apr. 1, 1997

Related U.S. Application Data

[63] Continuation-in-part of application No. 29/058,761, Aug. 22, 1996, Pat. No. Des. 390,328.

[51] Int. Cl.⁶ .................................................. B29C 39/12
[52] U.S. Cl. ........................................ 264/247; 264/310
[58] Field of Search .................................. 264/310, 311, 264/301, 302, 303, 306, 247, 245, 242, 251, 254

[56] References Cited

U.S. PATENT DOCUMENTS

| | | |
|---|---|---|
| D. 337,417 | 7/1993 | McNiven. |
| D. 362,096 | 9/1995 | Loper. |
| 936,215 | 10/1909 | Broberg. |
| 1,195,016 | 8/1916 | Hillman. |
| 1,642,806 | 9/1927 | Choate. |
| 1,794,503 | 3/1931 | Underwood. |
| 3,341,896 | 9/1967 | Barnett et al.. |
| 3,443,005 | 5/1969 | Braun. |
| 4,290,712 | 9/1981 | Hayes. |
| 4,367,844 | 1/1983 | Drummond. |
| 4,368,842 | 1/1983 | DeLange, III. |
| 4,600,143 | 7/1986 | Harlow, Jr. et al.. |
| 4,783,302 | 11/1988 | Kurimoto. |
| 4,813,595 | 3/1989 | Johns, Jr. et al.. |
| 5,277,861 | 1/1994 | Zilbert. |
| 5,356,072 | 10/1994 | Thomas. |
| 5,356,589 | 10/1994 | Sugalsi. |
| 5,400,959 | 3/1995 | Cone. |
| 5,425,501 | 6/1995 | Wesorick. |
| 5,458,844 | 10/1995 | MacDougall. |
| 5,524,853 | 6/1996 | Varlaro. |
| 5,567,375 | 10/1996 | Filion et al.. |
| 5,648,030 | 7/1997 | Pemberton. |
| 5,741,453 | 4/1998 | Kennedy. |

OTHER PUBLICATIONS

Barrons Gaithersburg Lumber, Apr. 1989 Catalog, p. A12
The American Home, Jul. 1954, p. 93.

*Primary Examiner*—Karen Aftergut
*Attorney, Agent, or Firm*—Brooks & Kushman, P.C.

[57] ABSTRACT

A mailbox combines a box body and a support molded in one piece together with working hardware, such as a handle, a door or a hinge structure for closing and opening the door of the box. The support provides multiple mounting options through a leg with an elongated segment including an expanded foot, that can be embedded in a ground surface. Alternatively, the elongated segment is truncated to expose an open end of a hollow leg. The present invention also provides a process for molding a mailbox box portion and a post portion in one piece, with the box portion including a door, a box body, and a transition sleeve connecting the door to the box body. The sleeve is truncated from the door and the box body to form an open end on the box body, and the door is pivotally mounted at the open end of said box portion. A method for rotationally molding a one-piece product with two segregated exterior color portions includes separating first and second mold chambers in a mold part by a partition wall including an access opening filled with a barrier plastic. Separated color molding material is rotationally molded in each chamber until the barrier melts during the rotational molding process.

5 Claims, 3 Drawing Sheets

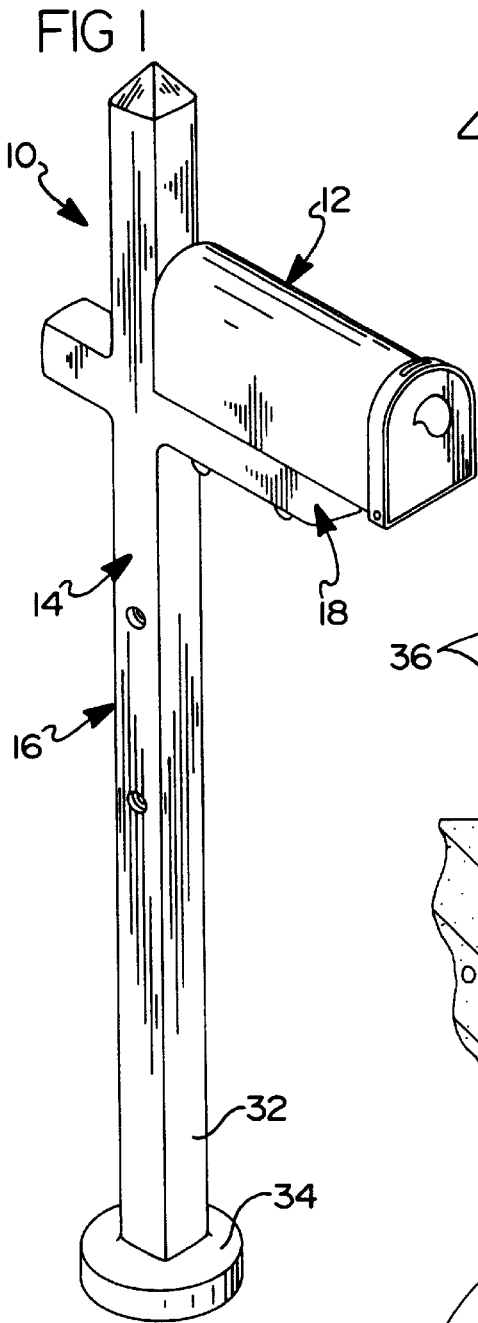
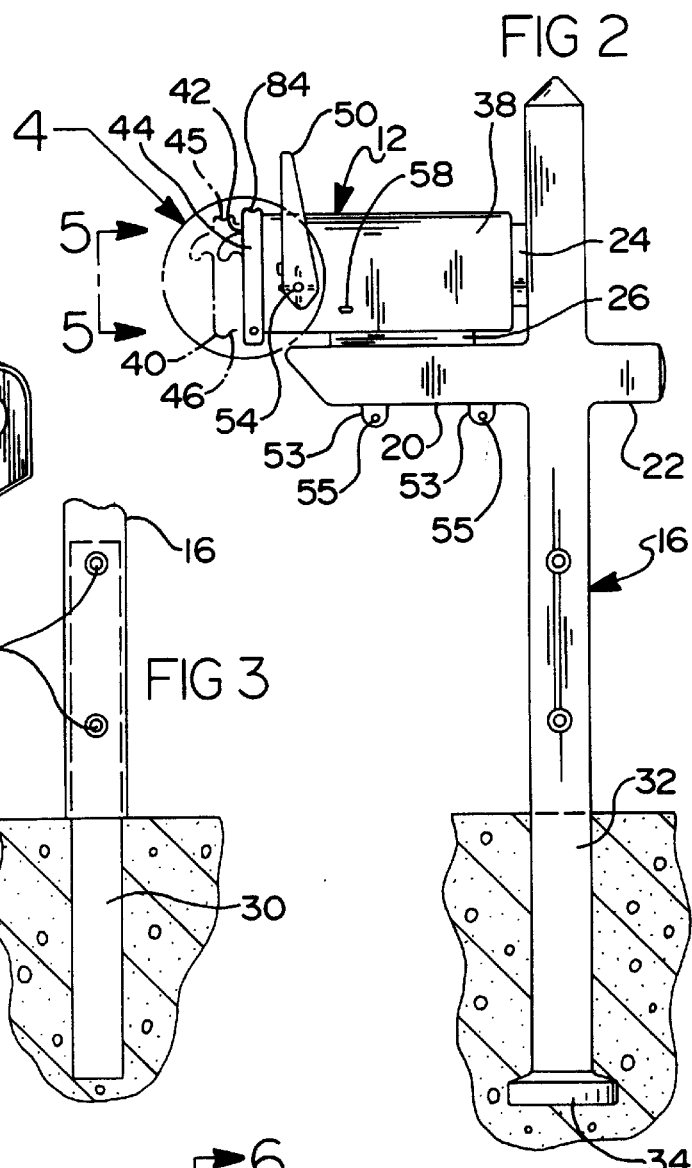
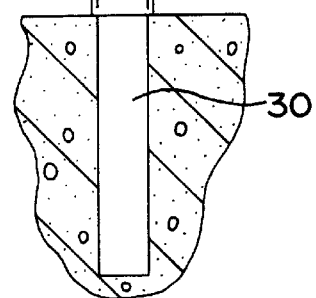
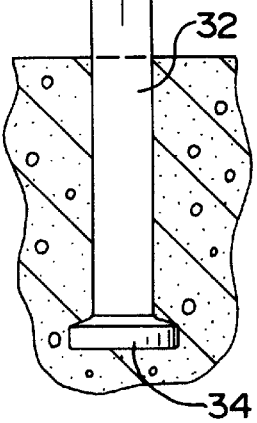
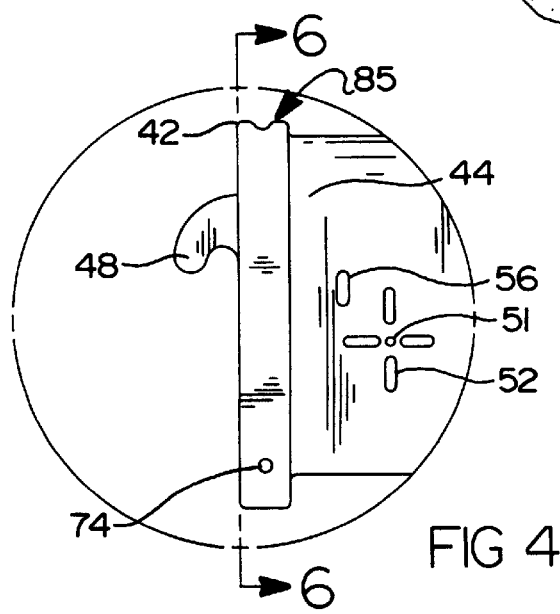

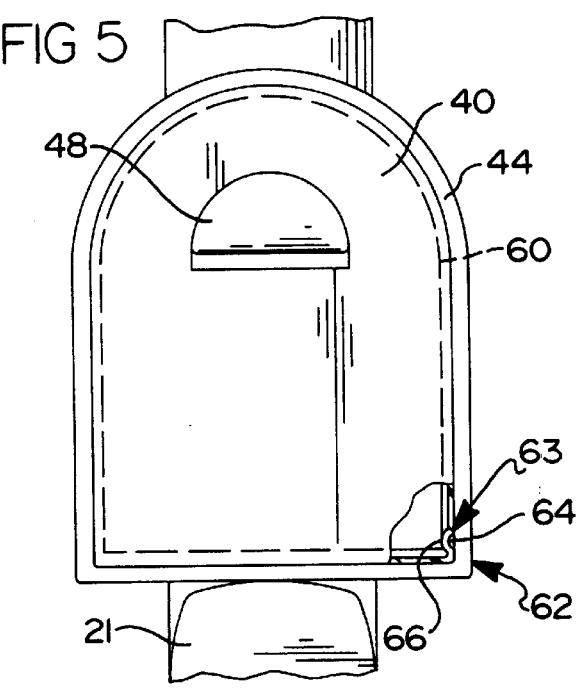
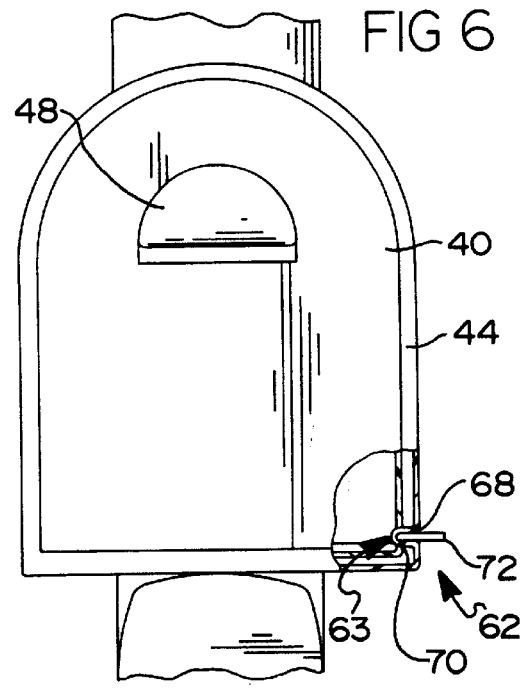
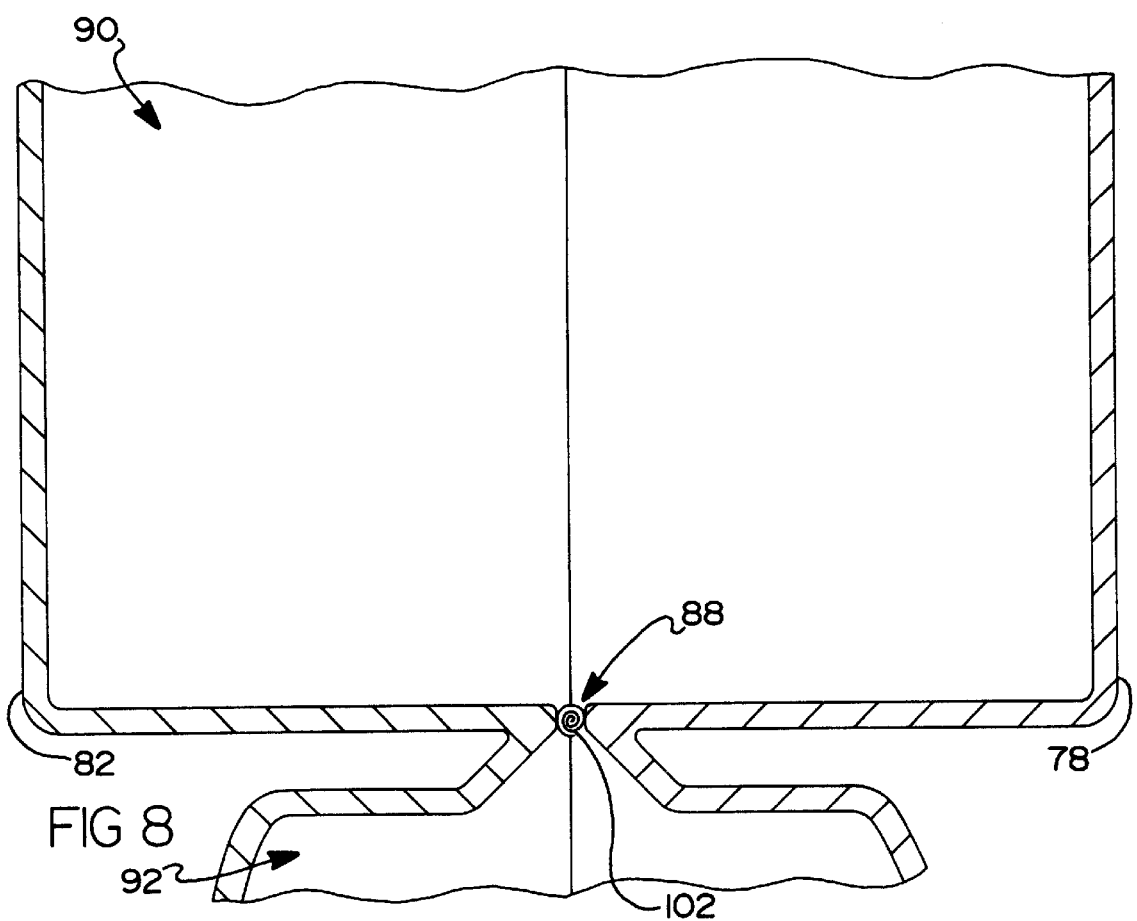

METHOD FOR MOLDING ONE-PIECE, MULTIPLE COLOR BODY

CROSS-REFERENCE TO RELATED APPLICATION

The present invention is a continuation-in-part of U.S. design application Ser. No. 29/058,761, filed Aug. 22, 1996, now U.S. Pat. No. D 390,328.

FIELD OF THE PRESENT INVENTION

The present invention relates to mailboxes and post supports for the boxes made in one piece through a molding process.

BACKGROUND ART

Mailboxes are often constructed separately from the posts that support them. As a result, the two pieces must be assembled to each other, and the support must be firmly supported by a ground surface. Structure and use of these boxes is limited by government imposed regulation. Accordingly, installation can be laborious and replacement of aged installations may be difficult.

Previously known attempts to improve the aesthetic appearance of the support or the box often employs the fabrication of additional components or assemblies of components made of different materials that further complicate the structure of the mailbox. Nevertheless, mailboxes are exposed to harsh environmental conditions and must remain operative. Accordingly, improvements are usually achieved only at greater expense. In addition, the exposure of numerous assemblies or components can accelerate deterioration of the mailbox that adversely affects the appearance of the mailbox and the utility of its functional features. For example, the functional features such as hinges for the door and the pivot support for a pick up flag may deteriorate and reduce service life, particularly under harsh and changing weather conditions.

Moreover, mailboxes and support posts are often positioned close to a roadway where they are readily accessible to postal workers in postal vehicles. In such a location, the mailboxes are subjected to inadvertent contact, repeated use and occasional abuse throughout their service life. Moreover, where the mailbox is positioned in a less exposed area, the strength and rigidity of supporting the box by a solid, embedded post, may not be required. In addition, installation of a wooden beam in the ground may only serve to complicate the installation of the mailbox.

Mailboxes made with some plastic materials have shown greater resistance to corrosion than metal boxes, but movable parts such as mail "pick up" flags and the hinge mechanisms supporting the door over a mailbox opening are often made of metal and may deteriorate and interfere with operation of the mailbox long before the plastic material portions near the end of their service life. Moreover, in some areas where the support ground is very moist, the use of an imbedded wood timber may be particularly inappropriate for supporting the mailbox.

SUMMARY OF THE PRESENT INVENTION

The present invention overcomes the above-mentioned disadvantages by providing a method and apparatus for forming a one piece mailbox and support post, including a box portion with the door integrally molded in one piece with the box portion. In addition, the post portion provides alternative ground engagement portions that provide flexibility in the manner in which the support is to be installed. Furthermore, the one piece construction includes molded working hardware, such as an integral hinge, a door handle, a pivot guide or other useful features, with the mailbox and post. For example, a preferred hinge includes a hinge pin formed on the door or the box, aligned for installation in an opening in the other portion, for pivotally supporting the molded door portion in the molded box portion. In addition, the present invention provides a method of providing two separately colored portions on a single, one piece molded product such as the mailbox and post structure of the preferred embodiment.

In the preferred embodiment, a molded, one piece mailbox includes a box portion and a post portion, the post portion integrally supporting the box. In addition, the molded box portion includes a door, and a transition sleeve connecting the door to a box body. By truncating the door and the box body from the transition sleeve, the separated door can be pivotally mounted at an open end of the box body. Preferably, the pivotal mounting is provided by integrally forming a hinge pin on one of the door and the box body, forming a recess dimensioned to receive the hinge pin, and positioning the door in alignment with the box body for mating engagement of the pin in the recess. Preferably, the door is dimensioned to be inserted within the open end of the box body to reduce exposed seams.

The molded post portion preferably includes a hollow chamber sized to receive a stanchion, for example, a standard sized post such as a nominal 4"×4" wooden post, when a lower portion of a leg of the post is truncated. However, such a stanchion is not required since an elongated leg segment including the expanded foot may be embedded in the ground in place of a separate imbedded stanchion. By removing the elongated leg segment including the expanded foot, an open end at the bottom of the post receives an embedded post. As a result, the mailbox is well adapted for simple but sturdy mounting in a wide variety of ground soil types and access positions.

The present invention also includes a method for making a mailbox and post including formation of a door in the same molding process as forming the box portion and the post portion. A mold cavity is configured to form a door adjacent a transition sleeve connecting the door to a box body. The sleeve is truncated from the door and from the box body to form an open end in the box body and a door that tightly closes the open end of the box body. Preferably, the door is pivotally mounted within the open end of the box portion. For example, a hinge pin formed on the door or on the box body is received in a recess formed in the other of the box or the door body, and the door is positioned to align the hinge pin with the hinge recess.

Another method according to the present invention includes rotationally molding a one piece product with two segregated color portions. The color portions may be exhibited on exterior as well as interior surfaces, particularly where the portion is formed with a single colored molding material throughout the molding period. However, other coloring techniques can be employed, for example, spraying mold part surfaces with different coloring before closing the mold parts. In the process, first and second mold chambers are formed in at least one mold part, and a partition wall is formed between the first and second chambers. A partition wall includes an access opening, and the mold part is prepared for molding by filling the access opening with a barrier plastic capable of melting within the period of rotational molding for a particular product. Preferably, the barrier plastic is a rolled sheet of plastic that enables the melting time to be controlled within the molding time. The mold chambers are closed, preferably after introducing a first color of molding material in the first chamber and a second color of molding material in the second chamber. In the preferred embodiment, the mailbox is molded, preferably in a single mold operating period, to form both a box portion that exhibits a first color and a post portion exhibiting a second color on the mailbox.

The present invention provides multiple post mounting techniques in a simple one-piece molded structure. In addition, the present invention provides enhanced resistance to corrosion and weather effects compared to previous multiple piece assembly mailboxes, for example, by minimizing attachments and the exposed seams. The invention also reduces the fabrication and assembly requirements for the door, the box and the post, preferably by integrating hinge structures in the molded one piece part. Moreover, the present invention provides a process for segregated coloring of a one-piece molded product, thereby simplifying or eliminating the finishing processes, such as painting, often required with other known types of materials and mailbox constructions.

BRIEF DESCRIPTION OF THE DRAWINGS

The present invention will be more clearly understood by reference to the following detailed description of a preferred embodiment when read in conjunction with the accompanying drawing, in which like reference characters refer to like parts throughout the views, and in which:

FIG. 1 is a perspective view of a molded mailbox constructed according to the present invention;

FIG. 2 is a side elevational view of the mailbox shown in FIG. 1;

FIG. 3 is an enlarged side view of a portion of the apparatus shown in FIG. 2;

FIG. 4 is an enlarged view of the portion 4 encircled in FIG. 2 with parts removed for clarity;

FIG. 5 is a front view taken substantially along the line 5—5 in FIG. 2 with parts broken away for clarity of a hinge structure;

FIG. 6 is a sectional view taken substantially along the line 6—6 in FIG. 4 with parts broken away for clarity of a modified hinge structure;

FIG. 8 is an enlarged cross-section substantially along the lines 8—8 in FIG. 7.

DETAILED DESCRIPTION OF A PREFERRED EMBODIMENT

Figure 7:
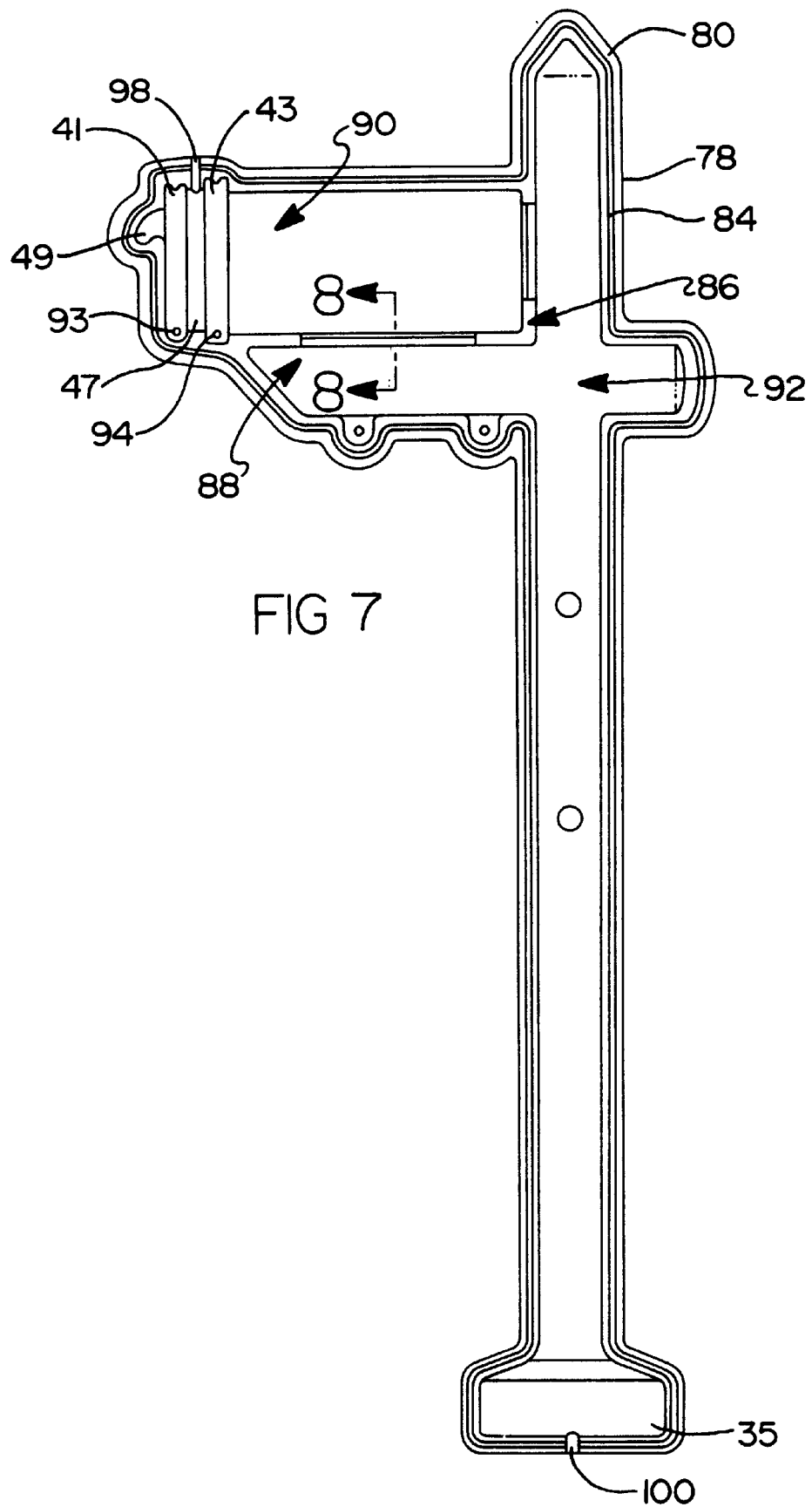
FIG. 7 is a plan view of a mold part for the process and apparatus constructed according to the present invention.

Referring first to FIG. 1, a mailbox 10 constructed in accordance with the present invention is thereshown comprising a box 12 and a support 14 molded in a single piece. The support 14 includes a leg 16 and a cross limb 18 having a front segment 20 (FIG. 2) extending below the box 12. Preferably, a rearward segment 22 of limb 18 simulates the appearance of cross-timbers for aesthetic purposes, although variations in the shape of the box 12 and the support 14 are also within the scope of the present invention.

As shown in FIG. 2, the support 14 is connected to the box 12 by webs 24 and 26 at the upper portion of the leg 16 and the top surface of the limb 20, respectively. In addition, the lower portion of the leg 16 includes a hollow chamber dimensioned to receive a stanchion 30, preferably a standard size post such as a nominal 4"×4" post. In addition, the lower end of the leg includes an elongated segment 32 including an expanded foot 34. The molded foot 34 anchors the mailbox 10 when the elongated segment 32 is embedded in a ground surface as shown in FIG. 2. Alternatively, when the elongated segment 32 is truncated as shown in FIG. 3, the hollow of the leg 16 receives the embedded post. In addition, the leg 16 can be bolted or otherwise retained on the stanchion 30, preferably through openings 36 that are molded with or subsequently cut into the leg 16.

As also shown in FIG. 2, the mailbox 12 is molded with a door portion 40 coupled by a transition sleeve 46 at an end 42 of a box body 38. In the preferred embodiment, the door 40 has a peripheral dimension adapted to be received within the end 42 of box body 38 when the transition sleeve 46 has been truncated. The sizing difference between the outer dimension of the door 40 and the inner dimension of the end 42 can be accounted for in the changing dimension of the sleeve 46. In addition, the end 42 of the preferred embodiment is expanded radially outwardly beyond the main body portion of the enclosure wall 44 so that a connecting wall portion lies behind the door 40. When the door is installed as discussed below, the connecting wall portion forms a weather barrier obstructing penetration of water from sprinklers, wind and rain into the chamber of the box body 38.

In addition, the box 12 preferably is molded with working hardware. For example, the door 40 includes an integrally curved handle 48 molded in one piece with the door 40 to extend forwardly from the door's front surface. Likewise, working hardware in the form of a hinge 62, preferably a molded pin hinge 63, is discussed in greater detail below. In addition, the molded door 40 includes a detent configuration, shown at 45, that conforms with the detent portion 84 at end 42, to form a detent 85 resiliently retaining the door in its closed position. In the preferred embodiment, the exterior concavity at the top of the door 40 receives the interior protrusion on the top of the end 42, although variations of the shapes and positions of the detent 85 formed during molding are also within the scope of the invention.

Moreover, when the box carries a pick up indicator in the form of a displaceable flag such as arm 50, as best shown in FIG. 4, the enclosure wall 44 of the molded box 12 may include surface protrusions 52 that together define a land surface that separates the flag 50 from the exterior surface of enclosure wall 44 and guides pivotal displacement of the arm 50 to prevent rubbing against the exterior surface of the box body. The protrusions 52 are aligned so as to surround a pivot point, for example, hole 51 molded or cut into enclosure wall 44. A fastener 54, preferably a stainless steel screw, is inserted through the enclosure wall 44 in the hole 51. The screw is retained by a nylon insert locking nut to form the pivot pin 54 that pivotally supports the displaceable flag 50. Preferably, the screw is tightened to frictionally support the flag 50 against the land surface formed by the protrusion 52 and retain the flag in its upright position. Of course, other pivot pin constructions, such as a plastic or metal pin, a snap-fit pin, a threaded bolt and nut combination, or other pivot connection could also be installed for pivotally coupling the flag arm 50 to the enclosure wall 44. Abutment stops 56 (FIG. 4) and 58 (FIG. 1) are aligned as stops for an upright and lowered position of the arm 50. The flag arm may be a fabricated arm, preferably molded plastic, although stamped metal or other materials can be used. The arm is provided with an apertured end sized to receive the body of the pin 54 that fits in hole 51 in wall 44, but smaller than an enlarged head on the screw used in the preferred embodiment.

When the body has been molded, for example, as discussed in detail below, the transition sleeve 46 is truncated from the door 40 and the end 42 of the body 38. The door 40 is pivotally installed at the end 42. In the preferred embodiment, the door 40 fits within the enclosure wall 44 at open end 42. A hinge 62 is then used to pivotally connect the door 40 at the end 42. Although any pivot or hinge may be installed, preferably, the hinge 62 is integrally formed, and preferably by forming a pin during the molding process. Non-limiting examples of molded hinge 63 components are shown in FIGS. 5 and 6.

The door 40 preferably includes a back flange 60 that extends to the outer periphery of the transition sleeve 46 so that when the door 40 is truncated from the sleeve 46, the flange 60 remains for strengthening of the side wall of the door and to provide support for the hinge structure 62. The front surface 21 of the front segment 20 of limb 18 may be removed, for example, by truncating the end of the limb, to form an additional reception chamber beneath box body 38. The lower surface of the front segment is shown including mounting protrusions 53 that may be formed with or punctured to include attachment openings 55. The openings receive fasteners for supporting a sign such as a name identification plaque or street number sign.

Preferably, the hinge 62 is a molded hinge 63 integrally formed with the door 40 and the enclosure wall 44 to avoid installation and assembly of parts having different materials, wearability and service life. In the cut-away portion of FIG. 5, the door 40 includes a recess 64 formed by a concave wall portion 66 at the peripheral edge of the door 40. As shown in FIG. 6, the recess 64 may also be formed as an opening 68 cut in the side wall of the door 40. Although the illustrated embodiments show a recess 64 in the door 40, it is also to be understood that the recess 64 may also be formed in the enclosure wall 44 when a hinge pin is formed on the door 40.

The pin 70 of the hinge 63 may also be formed during the molding process on either the enclosure wall 44 or the door 40. In the preferred embodiment, the pin 70 is formed by positioning a removable mold pin 72 in the side wall of the mold part to extend outwardly into the mold cavity and become covered with plastic material during a rotational molding process. Thereafter, when the molded part is removed from the mold part, the mold pin 72 is withdrawn from the recess 74 (FIG. 4) at the center of the rotationally molded hinge pin 70 (FIG. 6).

The one piece mailbox 10 of the present invention may be formed by various molding processes such as blow molding, injection molding, or others. However, rotational molding is preferred because a simple mold can be used and permits the formation of a single but hollow structure. Such a process distributes powder throughout an enclosed, heated mold cavity by biaxially rotating the heated mold parts, preferably about two orthogonal axes. Such a process melts the powder and forms a substantially uniform wall layer over the mold walls confining the cavity to make a hollow, enclosed body.

Two mold parts 78 and 82 are locked together in a conventional manner such as to form enclosed molding cavities 90 and 92. One of the mold parts may carry an externally configured insert located and locked in registration with one of the mold parts in a conventional manner, for example, to form an open ended chamber in limb 18, although the limb 18 is closed at front surface 21 in the preferred embodiment during molding. Nevertheless, the front surface 21 may be cut out after molding, for example, by the purchaser, to form an additional receptacle on the mailbox 10.

Additional features of rotational molding to form the combined mailbox and support 10 are shown in FIGS. 7 and 8. FIG. 7 shows a first mold part 78 including a peripheral wall 80 adapted to be sealed against a peripheral wall of second mold part 82 (FIG. 8) that mates against the peripheral wall 80. The mating surfaces are sealed by a gasket 84 or the like, that may be entrained in a surface groove, in a well known manner. Closing of the mold parts 78 and 82 encloses a molding chamber in which plastic particulate, for example polyethylene or other meltable, flowable material, can be displaced around the mold cavity to form a plastic layer along the entire surface forming the mold cavity.

In the preferred embodiment, the mold cavity is formed into first and second mold chambers 90 and 92 in each mold part 78 and 82 by including a partition wall 86 with at least one access opening 88 between the first chamber 90 and the second chamber 92. Separated access openings 88 permit the plastic material to form the webs 24 and 26 when the mold parts 78 and 82 are closed together. In addition, the chamber 90 includes a portion 41 for forming the door 40, a portion 47 for forming the transition sleeve 46 and the cavity portion 43 for forming the open end 42 of a mailbox 12. The mold part wall includes projections and recesses as necessary, for example the projection 93 and the recess 94 used to form the recess 64 and the pin 70, respectively, in the preferred embodiment. Likewise, a recess 49 in each mold part permits formation of the handle 48.

Moreover, each chamber 90 and 92 has a vent for relieving pressure and permitting the flow of plastic to contact the entire peripheral wall surface of the chambers 90 and 92. As shown in FIG. 7, a vent opening including a venting tube 98 communicates with the mold cavity portion 43 in the transition area, for mold chamber 90. Similarly, a vent passage holding the tube 100 extends through the peripheral wall at the mold cavity portion 35 for forming the foot 34. As a result, these vent openings are positioned to avoid interference with the aesthetic appearance of the molded piece. In addition, they provide sealable access for introduction of particulate molding material.

The vent pipe, preferably, in the form of a teflon tube filled with fiberglass, avoids release of the molding powder. The tube resists accumulation of the plastic powder at the temperatures involved and vents the mold chamber to reduce the stresses and deformations that may result from expansion and contractions during heating and cooling of the mold and the molded part. Such venting aids the dimensional integrity and strength of the molded part as it forms along the complex shaped mold wall areas.

The mold wall surfaces may be treated by a release agent to avoid warp, for example, a liquid teflon-based mold release or a metallic soap powder. The assembled mold parts are then positioned in a rotation molding apparatus which biaxially rotates the closed mold under conventional heating conditions for the selected mold material, for example, in an oven heated to 525° F. for 15 minutes when polyethylene powder, for example, Exxon LL8361.27 linear low density powder sized at 35 mesh, is contained in the mold. Accordingly, the rotation molding apparatus operates in well known manner to form a layer of plastic material around the wall of the mold cavity. Moreover, changes in these parameters may be made, for example, holding oven temperatures below 700° F. and for shorter period to reduce warping during cooling, or the powder may be varied as desired, for example, MA 530-660 high density polyethylene from Quantum Chemical may be molded under appropriately adjusted temperature and molding times.

The mailbox 10 may then be removed from the mold parts after the molding operation. Of course, additional details of the mold parts and the molding process will be well known from other rotational molding publications, for example, Rotational Molding Operating Manual published by the Quantum Chemical Corporation, U.S.I. Division, Copyright 1990, incorporated by reference. The formed layer has a substantially uniform wall thickness.

Of course, numerous other materials can also be molded in a rotational molding process. For example, polycarbonate, nylon, polyvinyl chloride, polyesters, polypropylene may also be used as desired. In addition, ABS, acetals, acrylics, cellulosics, epoxy, fluorocarbons, phenolics, polybutylene, polystyrene, polyurethane and silicone may be also be employed in rotational molding techniques to form mail boxes and practice methods in accordance with the present invention.

The present invention also provides a method for rotationally molding a one-piece product with two segregated exterior color portions. For example, the mailbox portion 12 being molded in the chamber 90 may be provided with an exterior color separate from the color of the support 14 being molded in the chamber 92. In such a process, the access opening 88 is filled with a barrier plastic 102. When the mold parts are closed by sealing the mold parts 78 and 82 together, a first color molding material is introduced into chamber 90 and a second color molding material is introduced to chamber 92. As a result, the barrier plastic 102 separates the different colored materials and permits the interior mold part surface to be covered by the melting molding material only in one chamber. However, as the heating process continues, during which the mold parts are rotated about numerous axes so that a layer of material builds up along the peripheral wall of the mold chambers, the barrier plastic 102 begins to melt. When the molding process continues for a period longer than the melting time of the barrier plastic 102, the access opening 88 is again reopened to permit interconnection of the molding material between the first mold chamber 90 and the mold chamber 92 without affecting the exterior color at the peripheral surface of the mold chambers.

Preferably, the barrier plastic 102 comprises a rolled coil of elongated sheet, for example, thin polyethylene sheet a few mils thick. However, depending upon the material composition of the barrier and the molding material being processed, the thickness, preferably between 10–20 mils, and the number of coil turns may be varied as necessary to adjust the melting time of the barrier plastic 102. Moreover, the size, shape and positions of one or more access openings 88 may be adjusted to affect the timing of the melting of the barrier plastic and completion of the entire molding process.

As a result, the present invention provides a one-piece mailbox combined with a support which can be integrally molded in one piece with a working hardware such as connecting hinge structure. In addition, a single molded workpiece provides multiple mounting options for the combined mailbox and post since an elongated segment with an expanded foot can be embedded in a ground surface without modification, or it can be truncated so that an embedded stanchion can be received in a hollow leg. Moreover, the present invention provides a process for molding a movable door, mailbox and combined support post in one piece to reduce the number and fabrications of parts that must be assembled to the molded structure. In addition, the present invention provides a segregated color molding process, for use in a rotational molding method, in which separate chambers communicating through an access opening may be closed for a portion of the molding process time. The invention also provides a temporary barrier element that can melt during the molding process and unblock the access opening.

Having thus described the present invention, many modifications thereto will become apparent to those skilled in the art to which it pertains without departing from the scope and spirit of the present invention as defined in the appended claims.

What is claimed is:

1. A method for rotationally molding one-piece product with two segregated exterior color portions comprising:

forming first and second mold chambers in at least one first mold part, including forming a partition wall between said first and second chambers with an access opening;

filling said access opening with a barrier plastic;

closing said first and second mold chambers in said at least one first mold part with at least one second mold part;

introducing a first color of molding material in said first chamber;

introducing a second color of molding material in said second chamber; and rotationally molding said materials in said mold parts for a period including a melt time of said barrier plastic to melt said barrier plastic and reopen said access opening to permit interconnection of said molding materials between said first and second chambers.

2. The invention as defined in claim 1 wherein said barrier plastic comprises a rolled sheet.

3. The invention as defined in claim 2 wherein said rolled sheet is made of polyethylene.

4. The invention as defined in claim 1 wherein said forming comprises forming a plurality of access openings in said partition wall between said first and second chambers, and wherein said filling includes filling each of said plurality of access openings with a barrier plastic.

5. The invention as defined in claim 1 wherein said period is limited to permitting interconnection without affecting an exterior color at a peripheral surface of at least one of said mold chambers.

* * * * *